(12) United States Patent
Hill et al.

(10) Patent No.: US 12,135,107 B2
(45) Date of Patent: Nov. 5, 2024

(54) PIPE REPLACEMENT SYSTEM

(71) Applicant: TEAM INDUSTRIAL SERVICES, INC., Sugar Land, TX (US)

(72) Inventors: Paul Spencer Hill, Sugar Land, TX (US); Thomas Blyde Gibson, Sugar Land, TX (US)

(73) Assignee: Team Industrial Services, Inc., Sugar Land, TX (US)

( * ) Notice: Subject to any disclaimer, the term of this patent is extended or adjusted under 35 U.S.C. 154(b) by 493 days.

(21) Appl. No.: 17/604,844

(22) PCT Filed: Apr. 21, 2020

(86) PCT No.: PCT/US2020/029082
§ 371 (c)(1),
(2) Date: Oct. 19, 2021

(87) PCT Pub. No.: WO2020/219424
PCT Pub. Date: Oct. 29, 2020

(65) Prior Publication Data
US 2022/0196199 A1 Jun. 23, 2022

Related U.S. Application Data

(60) Provisional application No. 62/836,971, filed on Apr. 22, 2019.

(51) Int. Cl.
*F16L 55/172* (2006.01)
(52) U.S. Cl.
CPC .................. *F16L 55/172* (2013.01)
(58) Field of Classification Search
CPC ... F16L 55/168; F16L 55/1686; F16L 55/175; Y10T 428/20

(Continued)

(56) References Cited

U.S. PATENT DOCUMENTS 3,989,281 A * 11/1976 Wilde, Jr. ............. F16L 58/181
174/84 R
4,096,886 A 6/1978 Daspit
(Continued)

FOREIGN PATENT DOCUMENTS

ES 1067909 U 7/2008
RU 2097646 C1 11/1997
(Continued)

OTHER PUBLICATIONS

Extended European Search Report for Application No. 20795916.4 dated Oct. 2, 2023.

(Continued)

*Primary Examiner* — Patrick F Brinson
(74) *Attorney, Agent, or Firm* — Patterson + Sheridan, LLP (57) ABSTRACT

A pipe replacement system and for repairing a pipe. The pipe replacement system includes a wrap wrapped around a pipe outer surface to form a repair sleeve having a first termination section and a second termination section. The first termination enclosure encloses the first termination section to form a first pressure containing connection with the repair sleeve. The first termination enclosure includes a first outer seal disposed around the pipe on a pipe outer surface. The first outer seal is outwardly spaced from the first termination section to annularly seal on the pipe outer surface. The first termination enclosure further includes a first inner seal disposed around the repair sleeve on a repair sleeve outer surface. The first inner seal is inwardly spaced from the first outer seal to annularly seal on the repair sleeve outer surface.

19 Claims, 10 Drawing Sheets

(58) Field of Classification Search
USPC .................. 138/99, 97, 157, 172; 156/53
See application file for complete search history.

(56) References Cited

U.S. PATENT DOCUMENTS

| | | | |
|---|---|---|---|
| 4,559,974 A | 12/1985 | Fawley | |
| 4,756,338 A | 7/1988 | Guyatt et al. | |
| 5,123,451 A | 6/1992 | Savard | |
| 5,219,001 A | 6/1993 | Rennaker | |
| 5,632,307 A * | 5/1997 | Fawley | F16L 55/1686 264/36.17 |
| 5,814,387 A * | 9/1998 | Orihara | F16L 55/1686 285/15 |
| 7,165,579 B2 * | 1/2007 | Borland | F16L 55/175 285/15 |
| 7,387,138 B2 * | 6/2008 | Rice | F16L 55/175 156/53 |
| 7,673,654 B2 * | 3/2010 | Rice | F16L 55/1686 156/53 |
| 8,141,592 B2 * | 3/2012 | Rice | F16L 55/1686 156/53 |
| 2004/0129373 A1 * | 7/2004 | Nadarajah | F16L 55/168 156/94 |
| 2006/0118191 A1 | 6/2006 | Rice | |
| 2006/0272724 A1 | 12/2006 | Borland et al. | |
| 2010/0012215 A1 | 1/2010 | Morton et al. | |
| 2010/0200149 A1 | 8/2010 | Richard De Jong | |

FOREIGN PATENT DOCUMENTS

| | | |
|---|---|---|
| RU | 2380606 C2 | 1/2010 |
| RU | 2438065 C2 | 12/2011 |

OTHER PUBLICATIONS

Canadian Office Action in related application CA 3,137,718 dated.
International Search Report and Written Opinion in related application PCT/US2020029082 dated Jul. 23, 2020.
Written Opinion in related application SG 11202111500R dated Jun. 28, 2023.
Azerbaijan Office Action in related application a 2021 0105 dated May 6, 2022.

* cited by examiner

PIPE REPLACEMENT SYSTEM

CROSS-REFERENCE TO RELATED APPLICATIONS

This application is a National Phase filing under 35 U.S.C. § 371 of International Application PCT/US20/029082, filed on Apr. 21, 2020, which claims priority to U.S. Provisional Application Ser. No. 62/836,971, filed Apr. 22, 2019, entitled "PIPE REPLACEMENT SYSTEM," both applications are incorporated by reference in their entirety for all purposes.

FIELD OF DISCLOSURE

In general, this invention relates to repairing leaks in a pipe and, more particularly, to a pressure containing sleeve for sealing leaks through the exterior of a pipe wall.

BACKGROUND

Pipes often develop leaks along pipe and pipe fitting connections. Leaks can occur due to factors such as pipe deterioration over time, impact structural damage, or use in harsh environments.

Composite repairs for pipes are seeing marked growth in the industry because they reduce the costs incurred by operators in extending the life of their systems whilst maintaining integrity. Extended repair lengths are relatively common, exceeding ninety-one meters (three-hundred feet) in length. The technology is now standardized with ISO 24817 and ASME PCC-2 Article 401 being the most common references used to support the repairs.

Impaired and leaking pipes (and other pressure equipment) can be repaired using composite materials to form a composite repair. Impaired and leaking pipes may be classified as having a "Type A Defect" or a "Type B Defect" in accordance with industry and/or governmental standards applying to pipes used in different industries, including the energy industry. Pipes without holes and meeting other criteria may be classified as having a pipe defect termed a Type A Defect. Where there is a hole (or might be a hole during the intended life of the repair) then the pipe defect is termed a Type B Defect. However, the capability of these repairs is limited with regard to providing containment for leaks in the case the pipe becomes perforated and is a Type B Defect. When the capability of the repair is exceeded, the pipe fluid can be driven under or through the composite repair resulting in an external leak. Many of these failures result in fluid escaping from the termination of the repair.

What is needed, therefore, is an improved method of pipe repair that addresses containment for leaks through perforations in the pipe.

SUMMARY

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limited the scope of the claimed subject matter.

An embodiment of the present disclosure provides a pipe replacement system for repairing a pipe. The pipe replacement system includes a wrap wrapped around a pipe outer surface to form a repair sleeve having a first termination section and a second termination section. The first termination enclosure encloses the first termination section to form a first pressure containing connection with the repair sleeve. The first termination enclosure includes a first outer seal disposed around the pipe on a pipe outer surface. The first outer seal is outwardly spaced from the first termination section to annularly seal on the pipe outer surface. The first termination enclosure further includes a first inner seal disposed around the repair sleeve on a repair sleeve outer surface. The first inner seal is inwardly spaced from the first outer seal to annularly seal on the repair sleeve outer surface.

An embodiment of the present disclosure provides a pipe replacement method for repairing a pipe. The method includes wrapping a wrap around the pipe to form a repair sleeve having a first termination section and a second termination section, enclosing a first termination enclosure over the first termination section to form a first pressure containing connection with the repair sleeve. Enclosing the first termination enclosure over the first termination section includes disposing a first outer seal around the pipe on a pipe outer surface. The first outer seal is outwardly spaced from the first termination section to annularly seal on the pipe outer surface. Enclosing the first termination enclosure over the first termination section further includes disposing a first inner seal around the repair sleeve on a repair sleeve outer surface. The first inner seal is inwardly spaced from the first outer seal to annularly seal on the repair sleeve outer surface.

An embodiment of the present disclosure provides a pipe replacement method for repairing a pipe. The method includes wrapping a fiber wrap around the repair section of the pipe to form a repair sleeve having a first termination section and a second termination section, and enclosing a first termination enclosure over the first termination section to form a first pressure containing connection with the repair sleeve. Enclosing the first termination enclosure over the first termination section includes disposing a first outer seal around the pipe on a pipe outer surface. The first outer seal is outwardly spaced from the first termination section to annularly seal on the pipe outer surface. Enclosing the first termination enclosure over the first termination section further includes disposing a first inner seal around the repair sleeve on a repair sleeve outer surface. The first inner seal is inwardly spaced from the first outer seal to annularly seal on the repair sleeve outer surface. The method further includes enclosing a second termination enclosure over the second termination section to form a second pressure containing connection with the repair sleeve. Enclosing the second termination enclosure over the second termination section includes disposing a second outer seal around the pipe on the pipe outer surface. The second outer seal is outwardly spaced from the second termination section to annularly seal on the pipe outer surface. Enclosing the second termination enclosure over the second termination section further includes disposing a second inner seal around the repair sleeve on a repair sleeve outer surface. The second inner seal is inwardly spaced from the second outer seal to annularly seal on the repair sleeve outer surface. The repair sleeve is configurable in a leak path configuration where the repair sleeve forms a leak flow path extending from a pipe defect covered by the repair sleeve to the first termination enclosure and the second termination enclosure. The leak flow path is sealed from an external atmosphere by the first termination enclosure and the second termination enclosure.

BRIEF DESCRIPTION OF THE FIGURES

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements.

In general, the present disclosure relates to repairing leaks in pipes and, more particularly, to a system and method that prevents such a leak escaping to atmosphere resulting in the repair continuing to successfully contain the pipe pressure.

The present disclosure provides embodiments of a pipe replacement system that renovates pipes by forming a repair sleeve over the pipe to provide an entirely new means of enclosing the fluid at pressure and a new pressure boundary. Termination enclosures form a pressurized seal connections to termination sections of the repair sleeve. By forming pressurized seal connections at the termination sections, the termination enclosures prevent fluid from the pipe from leaking underneath the repair sleeve to the external atmosphere. Embodiments of the repair sleeve of the present disclosure may be formed on the pipe without requiring extensive grit blasting or other preparations to provide a clean pipe surface along a whole length of the repair section of the pipe to be covered by the repair sleeve. Abrasive techniques to prepare a clean pipe surface help improve the bond between the repair sleeve and the pipe outer surface but also has the potential of damaging a pipe that may be online. Embodiments of the present invention enclose the fluid pressure where there is a leak out of one or more termination sections of the repair sleeve because of pressure seals provided by the termination enclosures so that the pressure capability of the pipe replacement system is not determined by adhesion of the repair sleeve to the pipe. Pressure capability of the repair sleeve, without use of the termination enclosures, is limited by adhesion of the repair sleeve to the pipe—which is in turn governed by the surface preparation. Higher performance of a pipe repair and simpler installation can be achieved by removing reliance on adhesion between the repair sleeve and the pipe by using embodiments of the pipe replacement system having termination enclosures providing pressurized seal connection to the termination sections of the repair sleeve.

The repair sleeve of the disclosed embodiments forms a new pipe on top of and surrounding the repair section of the original pipe. The termination enclosures form a pressure seal at opposite termination sections to prevent fluid leaking underneath the repair sleeve from leaking from the termination ends. The repair sleeve may also adhere to the outer pipe surface when a wrap having an adhesive is wrapped around the pipe to the form the repair sleeve on the pipe. The repair sleeve bonded to the outer surface of the pipe may help block fluid from leaking from a through-hole defect, i.e. puncture in the pipe wall, underneath the repair sleeve, and from the termination sections to the atmosphere. The repair sleeve bonded to the outer surface of the pipe may only block fluid from leaking at the termination sections when the fluid pressure in the pipe is low and where the through-hole defects are limited. The termination enclosures operate to seal the repair sleeve to prevent a fluid leak to atmosphere at higher fluid pressures in the pipe and where the through hole defects are more substantial.

Figure 1:
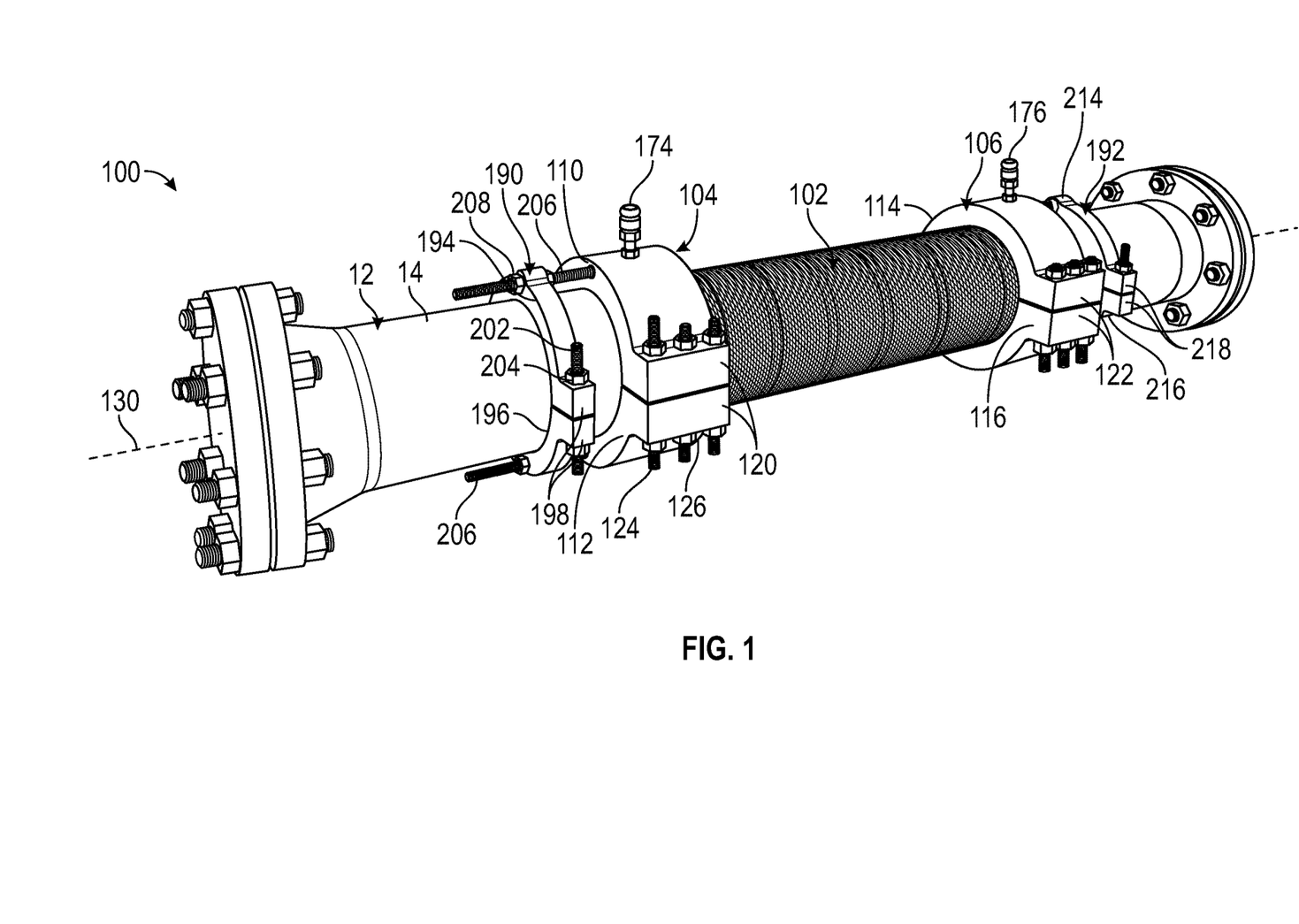
FIG. 1 is a perspective view of a pipe replacement system assembled on a pipe in accordance with embodiments of the present disclosure.
Figure 2:
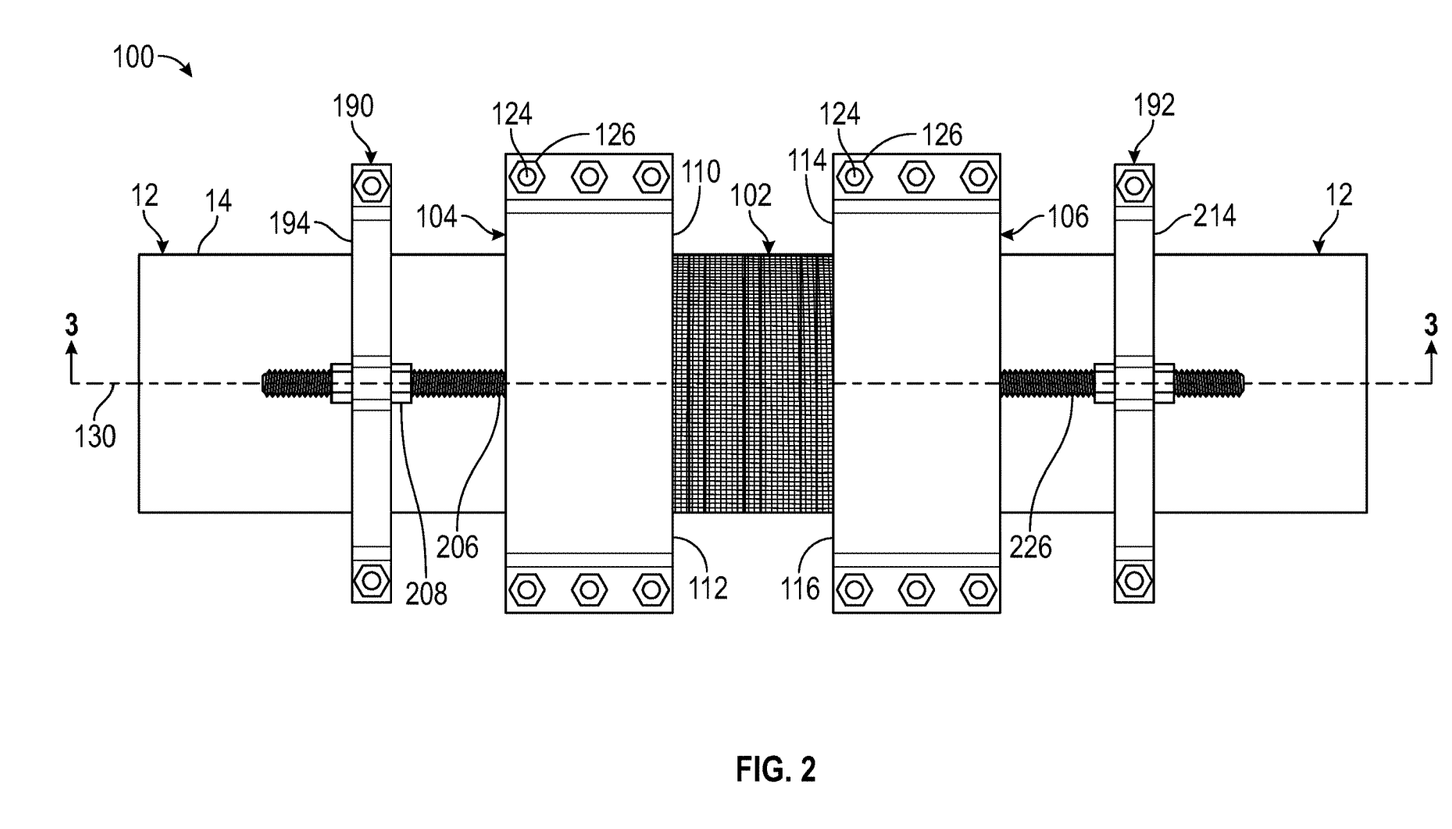
FIG. 2 is a top perspective view of the pipe replacement system assembled on the pipe in accordance with embodiments of the present disclosure.
Figure 3:
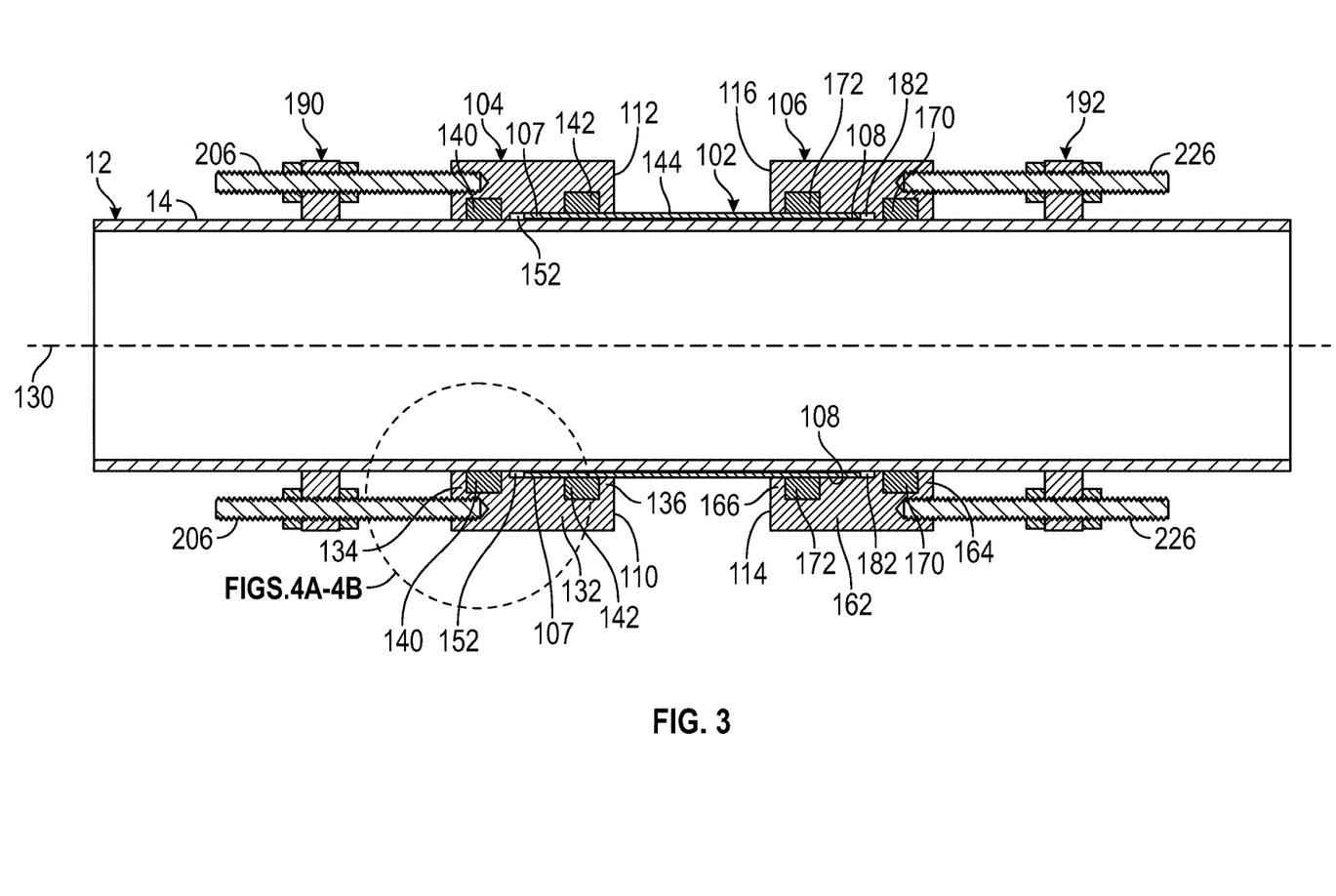
FIG. 3 is a side view of the pipe replacement system of FIG. 2 taken along the line 3-3 in accordance with embodiments of the present disclosure.

FIGS. 1-3 show an embodiment of the pipe replacement system, referred to generally as 100, of the present disclosure assembled on a pipe 12. Pipe replacement system 100 includes a repair sleeve 102 disposed on a pipe outer surface 14, a first sealing enclosure 104, and a second sealing enclosure 106. Repair sleeve 102 forms a repair sleeve bore through which the pipe 12 extends. Repair sleeve 102 may be formed by wrapping the pipe 10 with a wrap to form at least one layer over the pipe outer surface 14. The wrap is pliable and may be wrapped around the pipe 12 so that the repair sleeve 102 is formed to abut against the pipe out surface 14 and have an inner diameter approximately equal to the outer diameter of the pipe 12. The wrap may be a reinforcing material that has a fiber structure. The wrap may be made using materials including glass, carbon, and aramid reinforced polymers, typically epoxies and polyurethanes. The wrap may be non-metallic in some embodiments. The repair sleeve 102 typically, but not exclusively, comprises a composite material. Repair sleeve 102 may include multiple layers of the wrap wrapped circumferentially around the pipe 12.

Repair sleeve 102 extends axially along the pipe 12 and has a first termination section 107 and a second termination section 108 axially spaced from one another, as shown in FIG. 3. Repair sleeve 102 may have multiple layers and each layer may be formed by a different wrap layer. In some embodiments, the repair sleeve 102 may have one wrap layer, two wrap layers, or more than two wrap layers.

First sealing enclosure 104 and the second sealing enclosure 106 have a similar construction and are assembled at opposite ends of the repair sleeve 102. In some embodiments, a repair sleeve may use a first termination enclosure to enclose a first termination section, and a second termination enclosure is not used to enclose a second termination section. In some embodiments, more than two termination enclosures may be used to enclose a repair sleeve, such as a repair sleeve that has multiple sections. For example, a pipe may have a main line and a branch line extending from the main line to form a T-joint, and a repair sleeve is applied to cover the T-joint with the repair sleeve having opposing termination sections on the main line and a branch termination section the branch line. The opposing termination sections and the branch termination section may each have a termination enclosure to provide a pressure connection at each of the three different termination sections. In some embodiments, a repair sleeve may cover a portion of the main line and a portion of multiple branch lines with more than three termination sections and a termination enclosure providing pressure connection for each of the termination sections. FIG. 1 shows the pipe 12 with a pipe flange at each end. The pipe flanges may be used to connect to other pipe sections forming a longer pipe. The repair sleeve 102 may be configured to extend over pipe flanges to form an extended repair sleeve.

First termination enclosure 104 includes a first upper half 110 and a first lower half 112 that connect to form the first sealing enclosure 104. Second sealing enclosure 106 includes a second upper half 114 and a second lower half 116 that connect to form the second sealing enclosure 106. First upper half 110 and the first lower half 112 each have an enclosure flange 120 that mate to connect the first upper half 110 and the first lower half 112 together. Second upper half 114 and the second lower half 116 each have a second flange 122 that mate to connect the second upper half 114 and the second lower half 116 together. Mechanical fasteners formed by enclosure bolts 124 and enclosure nuts 126 connect the first upper half 110 to the first lower half 112 and connect the second upper half 114 to the second lower half 116. In some embodiments, the first termination enclosure 104 may have a non-split structure. In some assemblies of the pipe replacement system, the first termination enclosure 104 may be slid over the pipe 12 and the repair sleeve 102 to assemble the first termination enclosure 104 to pressure contain the first termination section 107.

Termination enclosures 104, 106 are assembled on the pipe 12 and are axially spaced from one another along a first axis 130. First axis 130 extends through the termination enclosures 104, 106 and through the repair sleeve 102 and the pipe 12, as shown in FIGS. 1-3. First axis 130 may be a central axis of the termination enclosures 104, 106 and the repair sleeve 102 and the pipe 12.

Figure 4A:
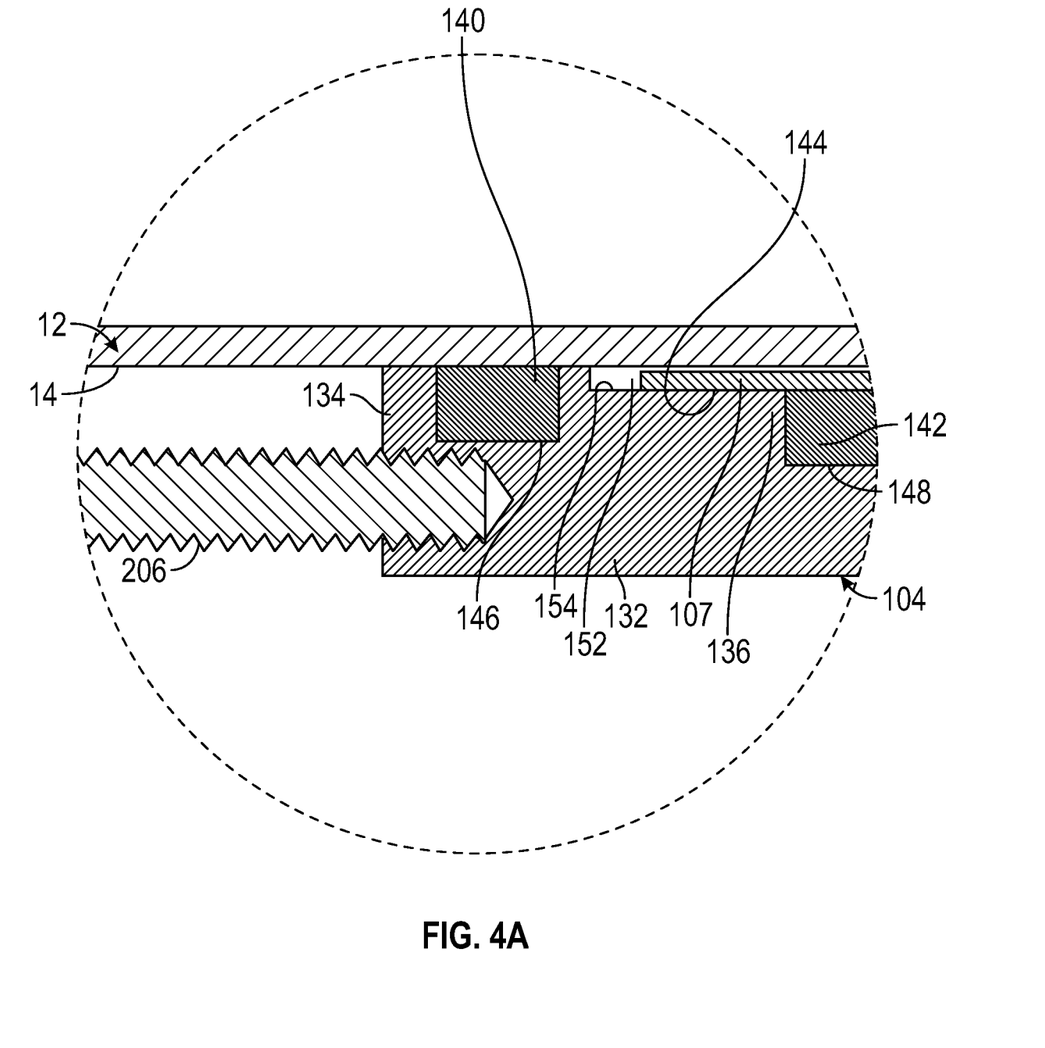
FIG. 4A is an enlarged view of a section of FIG. 3 showing a portion of a first termination enclosure for sealing a first termination section of a repair sleeve in accordance with embodiments of the present disclosure.

Referring to FIG. 3 and FIG. 4A, the first termination enclosure 104 has a first main body 132 having a first outer extension 134 and a first inner extension 136. First outer extension 134 and the first inner extension 136 extend radially inward from the first main body 132 and are spaced from one another. First outer extension 134 and the first inner extension 136 extend around the circumference of the pipe 12 to form annular extensions extending from the first main body 132. A first outer gland assembly formed by a first outer seal 140 is connected in the first outer extension 134. First outer seal 140 may be an annular seal that extends around an inner surface of the first outer extension 134 and around the pipe outer surface 14. A first inner gland assembly formed by a first inner seal 142 is disposed in the first inner extension 136. First inner seal 142 may be an annular seal that extends around an inner surface of the first inner extension 136 and around a sleeve outer surface 144. In some embodiments, the first outer seal 140 may be disposed in an outer seal slot 146, see FIG. 4A, forming an annular groove in the first annular extension and the first inner seal 142 may be disposed in an inner seal slot 148, see FIG. 4A, forming an annular groove in the first inner extension 136.

First termination enclosure 104 has a first enclosure cavity 152. First enclosure cavity 152 may be formed by the first main body 132. First enclosure cavity 152 is enclosed by a first cavity surface 154. First outer seal 140 and the first inner seal 142 seal the first enclosure cavity 152. A pressurized fluid leaking from a pipe hole in the pipe 12 may result in a pipe fluid flowing between the repair sleeve 102 and the pipe outer surface 14. The pipe fluid may flow in the first enclosure cavity 152 from a leak beneath the first termination section 107. First outer seal 140 is disposed adjacent and abuts against the pipe outer surface 114 to form an annular seal between the first enclosure 104 and the pipe outer surface 114. First inner seal 142 is disposed adjacent and abuts against the sleeve outer surface 144 to form an annular seal between the first termination enclosure 104 and the sleeve outer surface 144, as shown in FIG. 4A. First outer seal 140 and the first inner seal 142 seal the first enclosure cavity 152 to seal the repair sleeve 102 at the first termination section 107. First outer seal 140 and the first inner seal 142 may have an annular structure and be secured in the seal slots 146, 148. In some embodiments, the first outer seal 140 and the first inner seal 142 may be made of an elastomer.

Second termination enclosure 106 is constructed in a similar manner as the first termination enclosure 104 and seals the second termination section 108 of the repair sleeve 102. Second termination enclosure 106 has a second main body 162 having a second outer extension 164 and a second inner extension 166. Second outer extension 164 and the second inner extension 166 extend radially inward from the second main body 162 and are spaced from one another. Second outer extension 164 and the second inner extension 166 extend around the circumference of the pipe 12 to form annular extensions extending from the second main body 162. A second outer gland assembly formed by a second outer seal 170 is connected to the second outer extension 164. Second outer seal 170 may be an annular seal that extends around an inner surface of the second outer extension 164 and around the pipe outer surface 14. A second inner gland assembly formed by a second inner seal 172 is connected to the second inner extension 166. Second inner seal 172 may be an annular seal that extends around an inner surface of the second inner extension 164 and around the sleeve outer surface 144. In some embodiments, the second outer seal 170 may be disposed in an outer seal slot 146 forming an annular slot in the second outer extension 164 and the second inner seal 172 may be disposed in an inner seal slot 148 forming an annular slot in the second inner extension 166. In some embodiments, second outer seal 170 and the second inner seal 172 may have an annular structure and be secured in the seal slots 146, 148.

Second termination enclosure 106 forms a second enclosure cavity 182. Second enclosure cavity 182 may be formed in the second main body 162. Second enclosure cavity 182 is enclosed by a second cavity surface 184. Second outer seal 170 and the second inner seal 172 seal the second enclosure cavity 182. A pressurized fluid leaking from a pipe hole in the pipe 12 may result in a pipe fluid flowing between the repair sleeve 102 and the pipe outer surface 14. The pipe fluid may flow in the second enclosure cavity 182 from second termination section 108. Second outer seal 170 is disposed adjacent and abuts against the pipe outer surface 114 to form an annular seal between the second termination enclosure 106 and the pipe outer surface 114. Second inner seal 172 is disposed adjacent and abuts against the sleeve outer surface 144 to form an annular seal between the second termination enclosure 106 and the sleeve outer surface 144. Second outer seal 170 and the second inner seal 172 seal the second enclosure cavity 182 to seal the repair sleeve 102 at the second termination section 108.

In some embodiments, pipe replacement system 110 further includes a first ring restraint 190 and a second ring restraint 192, as shown in FIGS. 1-3, that are constructed in a similar manner. First ring restraint 190 includes a first restraint upper half 194 and a first restraint lower half 196. First restraint upper half 194 and first restraint lower half 196 each have a first restraint flange 198 that mate to connect the first restraint upper half 194 and the first restraint lower half 196 together. Mechanical fasteners formed by first restraint bolts 206 and restraint nuts 204 connect the first restraint upper half 194 to the first restraint lower half 196. First ring restraint 190 has a first restraint main body that forms a bore configured for the pipe 12 to extend therethrough. First ring restraint 190 may be tightened using the first restraint bolts 206 and the restraint nuts 204 to clamp the first ring restraint 192 to the pipe 12 to secure the first ring restraint 192 to the pipe 12. A first connector member formed by a first restraint bolts 206 and nuts 208 may be used to connect the first ring restraint 190 to the first termination enclosure 104. First ring restraint 190 may be used to secure the first termination enclosure 104 in first axial position on the pipe 12. First restraint bolts 206 may extend through the first restraint ring 190 and extend at least partially in the first termination enclosure 104.

Second ring restraint 192 includes a second restraint upper half 214 and a second restraint lower half 216. Second restraint upper half 214 and second restraint lower half 216 each have a second restraint flange 218 that mate to connect the second restraint upper half 214 and the second restraint lower half 216 together. Mechanical fasteners formed by first restraint bolts and restraint nuts connect the second restraint upper half 214 to the second restraint lower half 216. Second ring restraint 194 has a second restraint main body that forms a bore configured for the pipe 12 to extend therethrough. Second ring restraint 192 may be tightened using the first restraint bolts and the restraint nuts to clamp the second ring restraint 194 to the pipe 12 to secure the second ring restraint 194 to the pipe 12. A second connector member formed by a second restraint bolts 226 and nuts may be used to connect the second ring restraint 194 to the second termination enclosure 106. Second ring restraint 192 may be used to secure the second termination enclosure 106 in a second axial position on the pipe 12. Second restraint bolts 226 may extend through the second restraint ring 192 and extend at least partially in the second termination enclosure 106.

In some embodiments, a structural restraint between the repair sleeve 102 and the termination enclosures 104, 106 may be used to secure the termination enclosures 104, 106 to the repair sleeve 102. The structural restraint may be formed by mechanical fasteners that extend from the termination enclosures 104, 106 and in the repair sleeve 102.

In some embodiments, a structural restraint between the termination enclosures 104, 106 and the pipe 12 may be formed using an adhesive that bonds the termination enclosures 104, 106 to the pipe 12. For example, the adhesive may be applied to an inner surface of the first outer extension 134, shown in FIG. 4A, to adhesively secure the first termination enclosure 104 to the pipe outer surface 14.

Figure 4B:
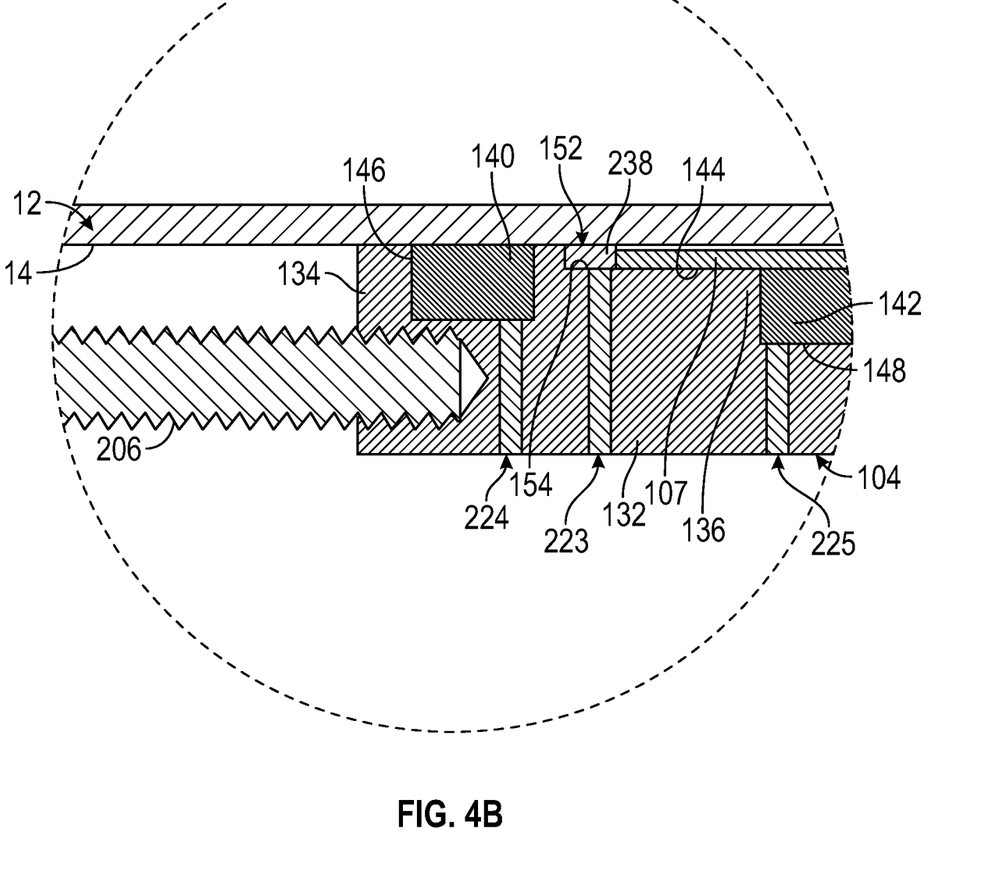
FIG. 4B is an enlarged view of the section of FIG. 3 showing a portion of the first termination enclosure for sealing the first termination section of the repair sleeve in accordance with embodiments of the present disclosure.

Referring to FIG. 4B, the first outer seal 140 and the first inner seal 142 may be an injected seal in some embodiments. In this embodiment, a first injection port 224 extends from an outer surface of the first termination enclosure 104 to the outer seal slot 146. There may be multiple spaced apart first injection ports 224 extending from the outer surface of the first termination enclosure 104 to the outer seal slot 146. A second injection port 225 extends from the outer surface of the first termination enclosure 104 to the inner seal slot 148. There may be multiple spaced second injection ports 225 extending from the outer surface of the first termination enclosure 104 to the inner seal slot 148. A fluid may be injected in the injection ports 224, 225 to form the first outer seal 140 and the first inner seal 142. The first outer seal 140 and the first inner seal 142 may form a continuous seal pipe outer surface 14 and the sleeve outer surface 144. The injected seal may cure or remain in its injected state sealing through adhesion compression or compaction.

In some embodiments, a first cavity seal 238 may be formed in the first enclosure cavity 152. An enclosure cavity injection port 223 extends from an outer surface of the first termination enclosure 104 to the enclosure cavity 152. There may be multiple spaced enclosure cavity injection ports 223 extending from the outer surface of the first termination enclosure 104 to the enclosure cavity 152. A fluid may be injected in the cavity injection port 223 and in the enclosure cavity 152 to form the first cavity seal 238. The first cavity seal 238 may form a continuous seal with the pipe outer surface 14 and the sleeve outer surface 144. The injected first cavity seal 238 may cure or remain in its injected state sealing through adhesion compression or compaction. In some embodiments, first cavity seal 238 may have an annular structure and be secured in the first enclosure cavity 152. In some embodiments, the injected first cavity seal 238 may be made of an elastomer.

First cavity seal 238 may seal the first enclosure cavity 152 to provide a pressure containment seal for the repair sleeve 102 at the first termination section 107. In some embodiments, the first cavity seal 238, the first outer seal 140, and the first inner seal 142 may be used in combination to provide a pressure containment seal for the repair sleeve 102 at the first termination section 107. Second termination enclosure 106 may be constructed in a similar manner as the first termination enclosure 104 and have a cavity seal 238.

Figure 5:
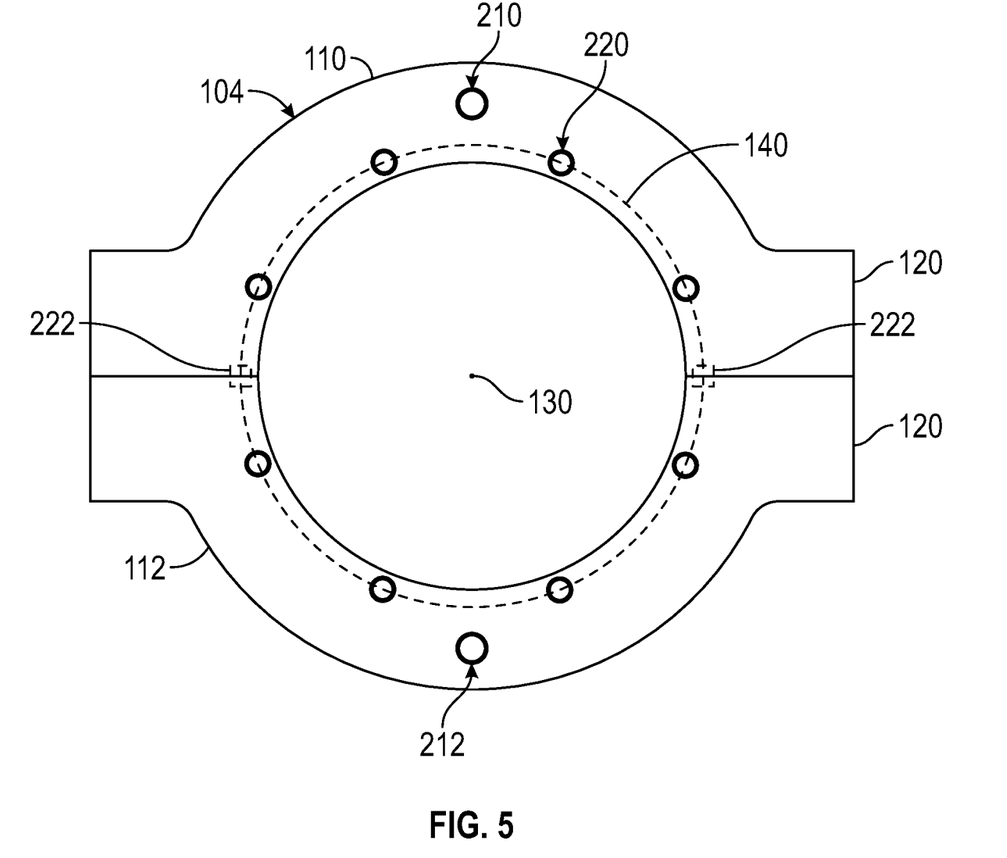
FIG. 5 is a front view of the first termination enclosure in accordance with embodiments of the present disclosure.

Referring to FIG. 5, a front view of the first termination enclosure 104 is shown. Termination enclosures 104, 106 have a similar construction and the description of the first termination enclosure 104 may apply to the second termination enclosure 106. First termination enclosure 104 has a cylindrical shape and forms an enclosure bore configured for a cylindrical pipe, not shown in FIG. 4, to pass through. In some embodiments, first termination enclosure 104 may have non-cylindrical shapes to accommodate a non-cylindrical pipe. First outer seal 140 is depicted in FIG. 5 with a dashed line and extends around the enclosure bore and the first axis 130. First outer seal 140 may have a ring or cylindrical shape, as shown in FIG. 5. A split-line seal formed by a flange gasket 222 extends between mating faces of the enclosure flanges 120, as shown in FIG. 5. Flange gasket 222 may intersect the first outer seal 140. Flange gasket 222 may extend axially between the enclosure flanges 120. Flange gasket 222 may be generally parallel to the first axis 130. Flange gasket 222 may seal the interface between the enclosure flanges 120. Flange gasket 222 may extend axially between the first outer seal 140 and the first inner seal 142. In some embodiments, flange gasket 222 may intersect both the first outer seal 140 and the first inner seal 142.

In some embodiments, seal activation holes 220 may be positioned through a front face of the first termination enclosure 104 and are spaced from one another around the enclosure bore and the first axis 130, as shown in FIG. 5. Seal activation members formed by seal activation screws 232, shown in FIG. 8, may be inserted in the seal activation holes 220 to mechanically energize the first outer seal 140 to form a pressure seal around the pipe outer surface 14. In some embodiments, the seal activation screws 232 may mechanically compress the first outer seal 140 to energize the first outer seal 140. First outer seal 140 and first inner seal 142 may be energized to form pressure seals, in some embodiments, in any number of different conventional manners to energize the seals formed by the first outer seal 140 and the first inner seal 142. First bolt hole 210 and a second bolt hole 212 are shown formed through the first face of the first termination enclosure 104 and are used to connect the first termination enclosure 104 to the first restraint bolts 206, shown in FIG. 3.

Figure 6:
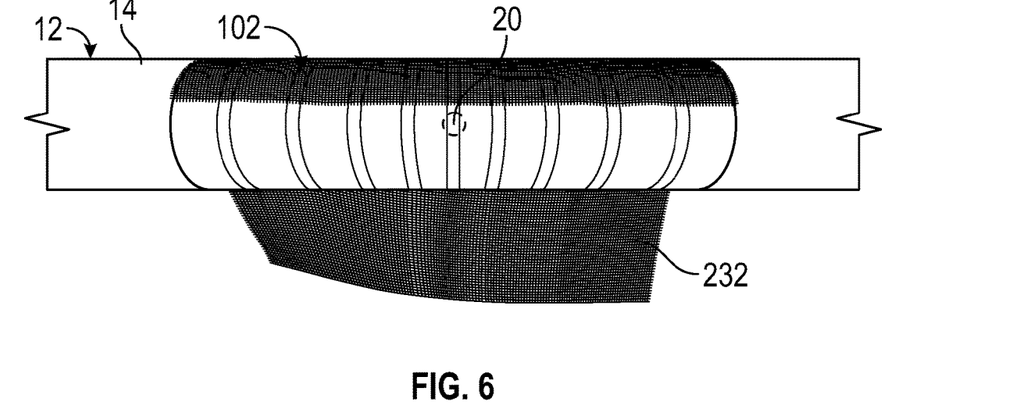
FIGS. 6-8 is a series of figures showing an assembly of the pipe replacement system on the pipe in accordance with embodiments of the present disclosure.
Figure 7:
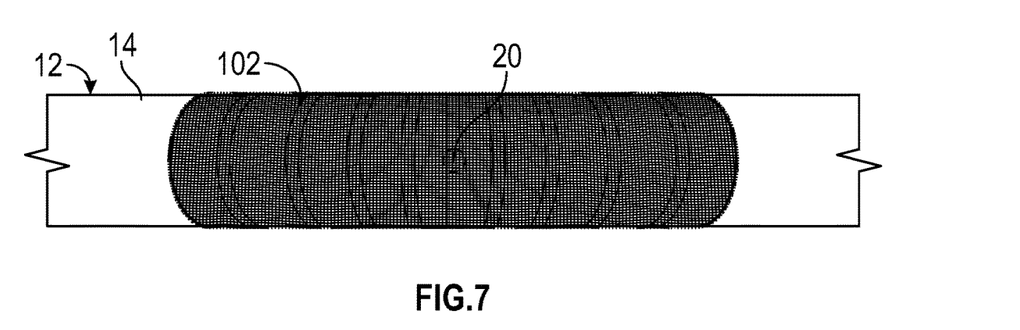
Figure 8:
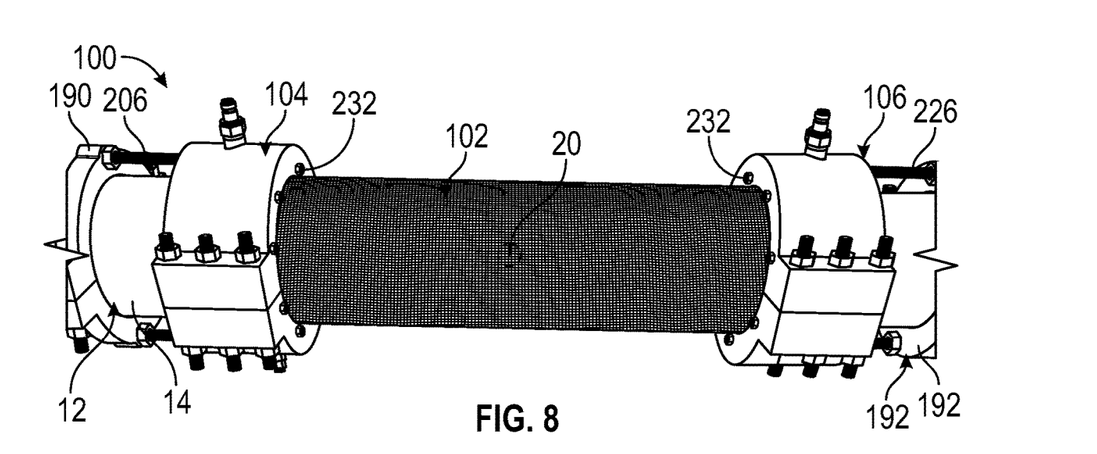

Referring to FIGS. 6-8, assembling the pipe replacement system 100 to repair a pipe 12 is shown. A repair is performed on the pipe 12 by wrapping a wrap 232 around a repair section of the pipe 12. Multiple layers of wrap 232 may wrapped around the repair section of the pipe 12. FIG. 6 shows a layer of wrap 232 in the process of being wrapped over one or more previously wrapped layers of the wrap 232. In some embodiments, different layers of the wrap 232 may be made of different materials. In some embodiments, the wrap may include an adhesive to bond one or more wrap layers 232 to the pipe outer surface 14 and to bond multiple layers of the wrap together. In some embodiments, the adhesive may be a resin. The wraps 232 used to form the repair sleeve 102 may have different widths. In some embodiments, a first wrap layer may be formed by overlapping the wrap 232 over the pipe 12 to form the first wrap layer. Additional wrap layers may be formed in a similar manner. Wrap 232 may be wrapped over a through-wall defect 20 of the pipe 12. Through-wall defect 20 may be a pipe hole or perforation in the pipe wall of the pipe 12.

Referring to FIG. 7, wrapping the wrap 232 over a repair section of the pipe 12 forms a repair sleeve 102 covering the through-wall defect 20 in the pipe 12. Referring to FIG. 8, after the repair sleeve 102 has been formed over the repair section 230, the termination enclosures 104, 106 may be connected on opposite ends of the repair sleeve 102. In addition, the first restraint ring 190 may be connected to the pipe 12 outwardly from the first termination enclosure 104 and the second restraint ring 192 may be connected to the pipe 12 outwardly from the second termination enclosure 106. First restraint bolts 206 may be connected to the first restraint ring 190 and the first termination enclosure 104 to secure the first termination enclosure 104 to the pipe 12. First restraint bolts 206 may be connected to the restraint ring 190 and the first termination enclosure 104 to secure the first termination enclosure 104 to the pipe 12. Second restraint bolts 226 may be connected to the second restraint ring 192 and the second termination enclosure 106 to secure the second termination enclosure 106 to the pipe 12.

Figure 9:
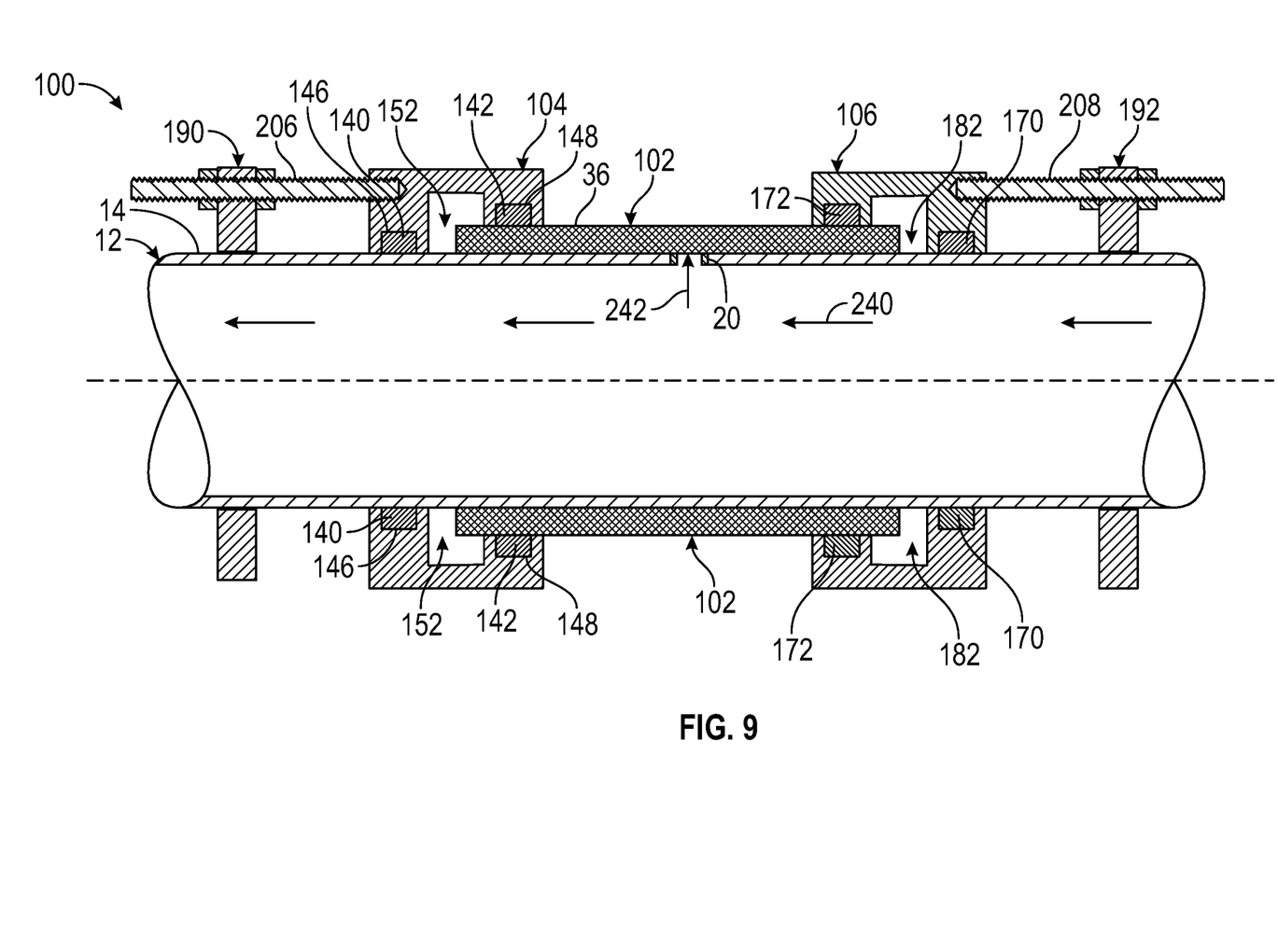
FIG. 9 is a schematic of the pipe replacement system assembled on the pipe in a non-leak path configuration in accordance with embodiments of the present disclosure.

Referring to FIG. 9, a schematic of the pipe replacement system 100 is shown assembled on the pipe 12 in a non-leak path configuration. Pipe 12 is online with fluid flowing in the pipe 12, as depicted by arrows 240. Pipe 12 may have fluid in the pipe 12 with the fluid applying pressure to the pipe walls. Operating conditions of the pipe 12 may cause the pipe walls to deteriorate over time such that the pipe 12 forms a pipe defect. For example, a pipe defect may include a through-wall defect 20 in the pipe wall of pipe 12, as shown in FIG. 9. Repair sleeve 102 is wrapped over the pipe 12 and over the through-wall defect 20. Repair sleeve 102 may be bonded to the pipe outer surface 14 such that through-wall defect is blocked by the repair sleeve 102 and the pipe fluid is blocked from flowing underneath the repair sleeve 102 to the termination enclosures 104, 106.

Figure 10:
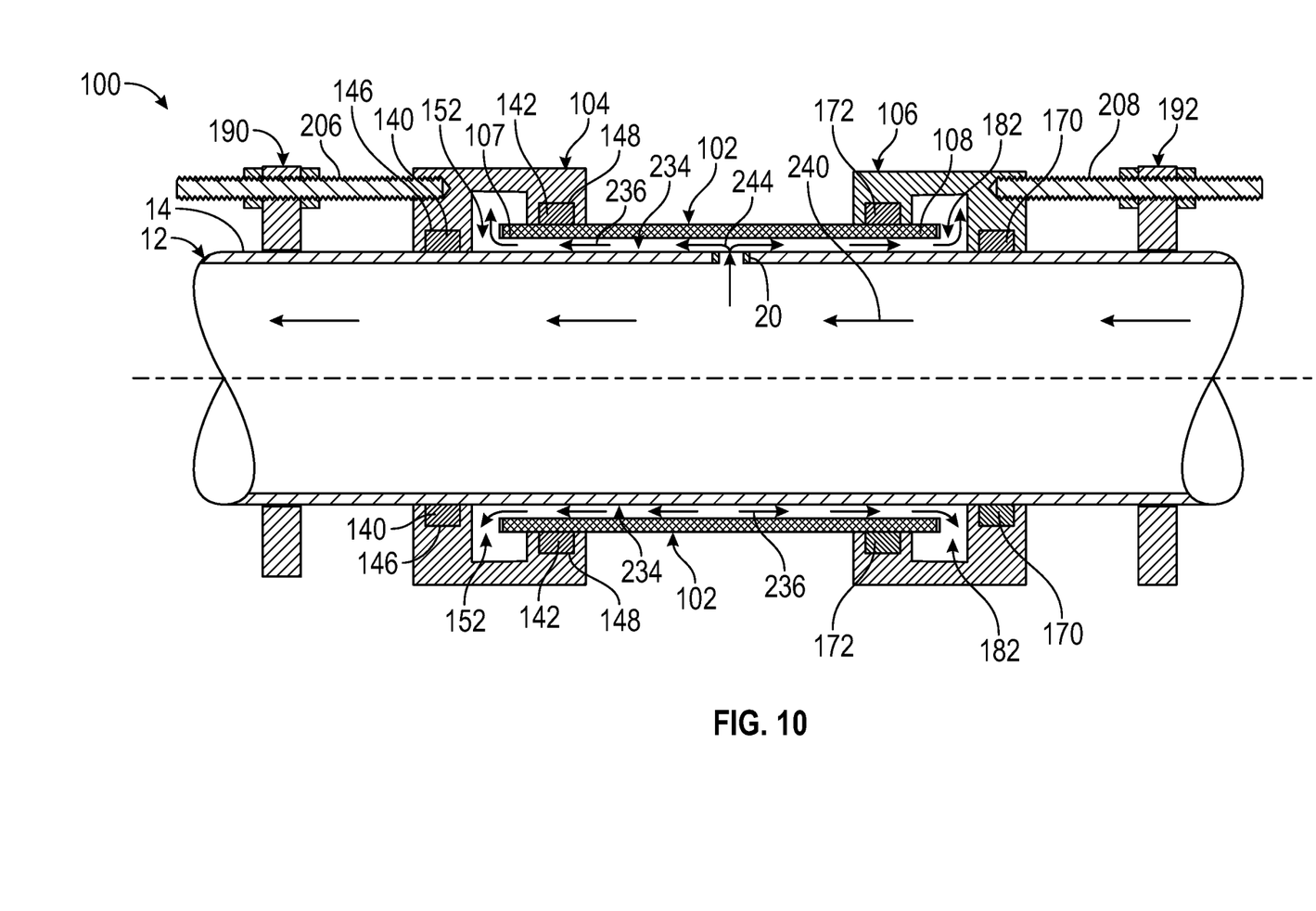
FIG. 10 is a schematic of the pipe replacement system assembled on the pipe in a leak path configuration in accordance with embodiments of the present disclosure.

Referring to FIG. 10, a schematic of the pipe replacement system 100 is shown assembled on the pipe 12 in a leak path configuration. Fluid pressure from the pipe 12 may exert fluid pressure through the through-hole defect 20 on the portion of the pipe sleeve 102 overlying the through-hole defect 20. The fluid pressure on the repair sleeve 102 may result in the adhesive bond between the repair sleeve 102 and the pipe outer surface 14 failing and a leak flow path 234 forming under the repair sleeve 102. Leak flow path 234 extends from the through-hole defect 20 to either the first enclosure housing 104, the second enclosure housing 106, or both enclosure housings 104, 106. Leak flow path 234 is depicted in FIG. 10 as extending from the through-hole defect 20 to the termination enclosures 104, 106. Pipe fluid flows from the through-hole defect to the enclosure cavities 152, 182, as depicted by arrows 236, 244. Termination enclosures 104, 106 form a pressure containing connection at the termination sections 107, 108 of the repair sleeve 102 to block pipe fluid in the leak flow path from flowing to an external atmosphere outside of the termination enclosures 104, 106. In other words, the first outer seal 140 and the first inner seal 142 seal with the pipe outer wall 14 and the outer surface of the repair sleeve 102, respectively, to block pipe fluid from exiting from the first enclosure cavity 152, and the second outer seal 170 and the second inner seal 172 seal with the pipe outer wall 14 and the outer surface of the repair sleeve 102, respectively, to block pipe fluid from exiting from the second enclosure cavity 182.

Figure 11:
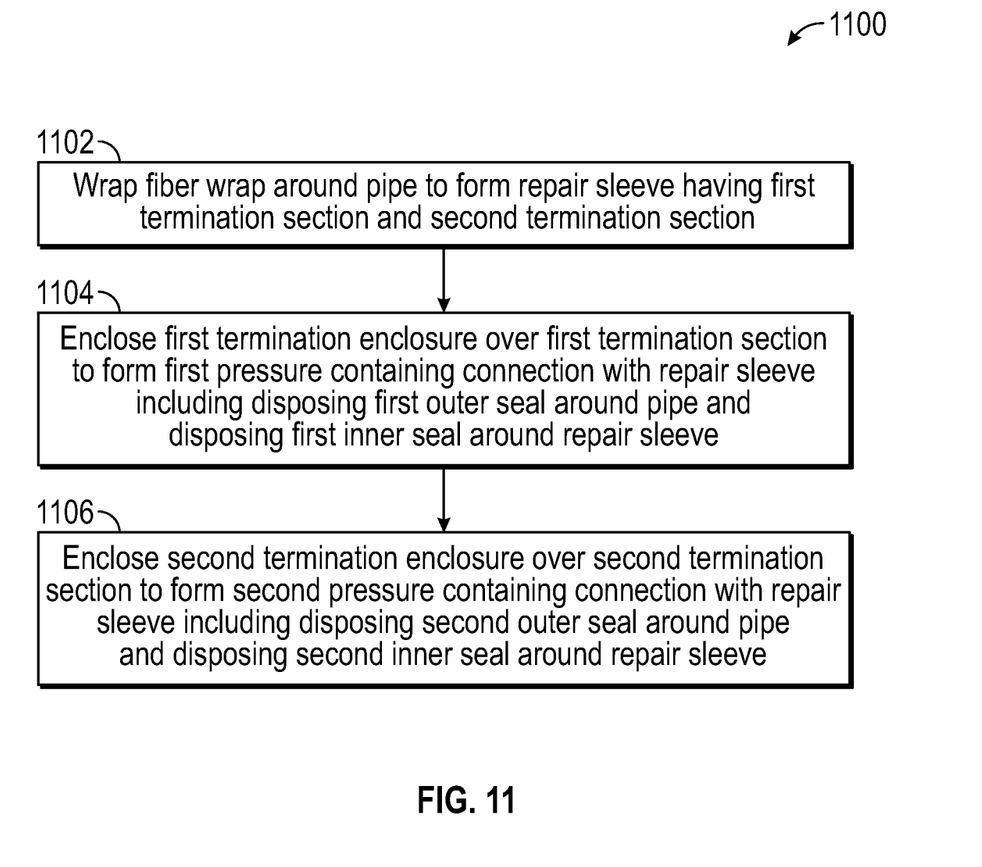
FIG. 11 is a flowchart of a method of repairing a pipe with the pipe replacement system in accordance with embodiments of the present disclosure.

In operation, a pipe replacement method 1100 may be performed for repairing a pipe containing a pipe fluid. A pipe defect may be identified in a repair section of the pipe. The pipe defect may be a through-wall defect. In some embodiments, the pipe defect may be determined based on the condition of the pipe. For example, wall thickness of the pipe may be one factor in a determination that there might be a hole during the intended life of the repair of the pipe.

A wrap is wrapped around the repair section of the pipe to form a repair sleeve having a first termination section and a second termination section [block 1102]. The repair sleeve may cover a pipe defect, such as a through-hole defect in the pipe wall. The repair sleeve may have an adhesive configured to bond the repair sleeve to the pipe outer surface. Wrapping the wrap around the pipe outer surface includes bonding the repair sleeve to the pipe outer surface with the adhesive.

In some embodiments, the first termination section of the repair sleeve may be abrasively cleaned to form a first outer diameter for the first termination section. The repair sleeve may be abrasively cleaned using had tools or other abrasive techniques. The first termination section may be abrasively cleaned to configure an outer diameter for the first termination section to conform to an inner diameter of the first inner seal of the first termination enclosure so that the first inner seal forms a seal on the abrasively cleaned first termination section. In some embodiments, the second termination section may be abrasively cleaned to adjust a second outer diameter of the second termination section. The second termination section may be abrasively cleaned to configure an outer diameter of the second termination section to conform to an inner diameter of the second inner seal of the second termination enclosure so that the second inner seal forms a seal on the abrasively cleaned second termination section.

A first termination enclosure is enclosed over the first termination section to form a first pressure containing connection with the repair sleeve. Enclosing the first termination section includes disposing a first outer seal around the pipe on a pipe outer surface where the first outer seal is outwardly spaced from the first termination section to annularly seal on the pipe outer surface. Enclosing the first termination section further includes disposing a first inner seal around the repair sleeve on a repair sleeve outer surface where the first inner seal is inwardly spaced from the first outer seal to annularly seal on the repair sleeve outer surface [block 1104]. The first termination is enclosed over the repair section of the pipe by connecting the first upper half of the first termination enclosure with the first lower half of the first termination enclosure.

A second termination enclosure encloses over the second termination section to form a second pressure containing connection with the repair sleeve. Enclosing the second termination section includes disposing a second outer seal around the pipe on the pipe outer surface where the second outer seal is outwardly spaced from the second termination section to annularly seal on the pipe outer surface. Enclosing the second termination section further includes disposing a second inner seal around the repair sleeve on a repair sleeve outer surface where the second inner seal inwardly spaced from the second outer seal to annularly seal on the repair sleeve outer surface [block 1106].

The repair sleeve is configurable in a leak path configuration where the repair sleeve forms a leak flow path from a pipe leak section covered by the repair sleeve to the first termination enclosure or the second termination enclosure and the leak flow path is configured to be sealed from an external atmosphere by the first termination enclosure and the second termination enclosure. In some embodiments, the repair sleeve has an adhesive configured to bond the repair sleeve to the pipe outer surface. The repair sleeve, in some embodiments, is configurable in a non-leak path configuration where the repair sleeve is bonded to the pipe outer surface to block pipe fluid flow from a pipe defect section covered by the repair sleeve from flowing to either the first termination enclosure or the second termination enclosure.

Embodiments of the present disclosure provide the benefits such as, but not limited to, the following: (a) allowing the repair sleeve to perform at higher pressure in comparison to repairs designed to the industry and governmental standards, such as standards described in ISO 24817 and ASME PCC-2 Article 401; (b) removes the need for surface preparation on the original pipe before wrapping a wrap over the pipe to form the repair sleeve; and (c) allows the repair sleeve thickness to be reduced.

For example, embodiments of the pipe repair system assembled on a pipe may have a repair sleeve that moves from a non-leak path configuration to a leak path configuration when the bond between the repair sleeve and the pipe outer surface fails. Because the leak path configuration typically can handle higher fluid pressures compared to the non-leak path configuration, a failure of the adhesive bond will not necessarily result in fluid leak to the atmosphere. In contrast, composite repairs not using termination enclosures may have to be designed with thicker walls or may not be suitable for repairing pipes containing fluids at higher fluid pressures. Embodiments of the pipe replacement system may have repair sleeves having thicknesses configured for Type A Defects according to industry or governmental standards (no through-hole defect or expected through-hole defect during the intended life of the repair) when the repair sleeve will be used for a pipe having a Type B defect (through-hole defect or expected through-hole defect during the intended life of the repair).

The pressure capability of a composite repair may be governed by the adhesive, such as a resin, bonding the composite repair to the pipe. Composite repairs, without use of embodiments of the termination enclosures, may be limited for pipes having a through-hole defect or perforation—performance is typically an order of magnitude lower than when the composite repair simply has to provide structural reinforcement where there is no perforation and where the pipe is identified as a pipe that will not have a perforation during the life of the pipe. A composite repair, without use of embodiments of the termination enclosures, has a capability that relies on the repair bonding strongly to the pipe (specifically, achieving a high bond toughness rather than strength) and this is governed by the quality of surface preparation completed, such as abrasive techniques. Abrasive techniques include abrasively cleaning the pipe outer surface using grit blasting or other abrasive cleaning using hand tools. The pipe replacement system in accordance with embodiments of the present disclosure reduces or eliminates the requirement of abrasively cleaning the pipe outer surface before forming the repair sleeve on the pipe.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A pipe replacement system for repairing a pipe, comprising:
    a wrap wrapped around a pipe outer surface to form a repair sleeve having a first termination section and a second termination section; and
    a first termination enclosure enclosing the first termination section to form a first pressure containing connection with the repair sleeve, wherein the repair sleeve is configurable in a leak path configuration where the repair sleeve forms a leak flow path extending from a pipe defect covered by the repair sleeve to the first termination enclosure and sealed from an external atmosphere by the first termination enclosure, the first termination enclosure including:
        a first outer seal disposed around the pipe on a pipe outer surface, the first outer seal outwardly spaced from the first termination section to annularly seal on the pipe outer surface; and
        a first inner seal disposed around the repair sleeve on a repair sleeve outer surface, the first inner seal inwardly spaced from the first outer seal to annularly seal on the repair sleeve outer surface.

2. The pipe replacement system of claim 1, wherein the first termination enclosure further includes a first upper half and a first lower half configured to be connected to form the first termination enclosure.

3. The pipe replacement system of claim 2, wherein the first termination enclosure forms a first cavity containing the first termination section where the cavity is pressure sealed by the first outer seal and the first inner seal to seal a pipe leak having the leak flow path from under the first termination section to the first cavity.

4. The pipe replacement system of claim 1, wherein the first outer seal has a first seal diameter and the first inner seal has a second seal diameter where the first seal diameter is less than the second seal diameter and wherein the wrap is made of a composite material.

5. The pipe replacement system of claim 1, wherein the repair sleeve has an adhesive configured to bond the repair sleeve to the pipe outer surface, wherein the repair sleeve is configurable in a non-leak path configuration where the repair sleeve blocks pipe fluid flow from a pipe defect section covered by the repair sleeve from flowing to the first termination enclosure and to seal the pipe defect from the external atmosphere with the repair sleeve, and wherein the repair sleeve is configured to move from the non-leak path configuration to the leak path configuration.

6. The pipe replacement system of claim 1, further comprising:
    a first ring restraint disposed around the pipe and spaced outwardly from the first termination enclosure, the first ring restraint including a first restraint upper half connected to a first restraint lower half to connect the first ring restraint to the pipe; and
    a first restraint bolt connected between the first ring restraint and the first termination enclosure to secure the first termination enclosure in a first axial position on the pipe.

7. The pipe replacement system of claim 1, further comprising:
    a second termination enclosure enclosing the second termination section to form a second pressure containing connection with the repair sleeve, the second termination enclosure including:
        a second outer seal disposed around the pipe on the pipe outer surface, the second outer seal outwardly spaced from the second termination section to annularly seal on the pipe outer surface; and
        a second inner seal disposed around the repair sleeve on the repair sleeve outer surface, the second inner seal inwardly spaced from the second outer seal to annularly seal on the repair sleeve outer surface.

8. The pipe replacement system of claim 7, wherein the first termination enclosure is axially spaced from the second termination enclosure.

9. A pipe replacement method for repairing a pipe, the method comprising:
    wrapping a wrap around the pipe to form a repair sleeve having a first termination section and a second termination section, wherein:
        the repair sleeve is configurable in a leak path configuration and a non-leak path configuration; and
        the repair sleeve has an adhesive configured to bond the repair sleeve to the pipe outer surface;
    enclosing a first termination enclosure over the first termination section to form a first pressure containing connection with the repair sleeve, wherein:
        the enclosing the first termination enclosure over the first termination section including:
            disposing a first outer seal around the pipe on a pipe outer surface, the first outer seal outwardly spaced from the first termination section to annularly seal on the pipe outer surface; and
            disposing a first inner seal around the repair sleeve on a repair sleeve outer surface, the first inner seal inwardly spaced from the first outer seal to annularly seal on the repair sleeve outer surface;
        in the leak path configuration the repair sleeve forms a leak flow path from a pipe leak section covered by the repair sleeve to the first termination enclosure and the leak flow path is sealed from an external atmosphere by the first termination enclosure; and
        in the non-leak path configuration, the repair sleeve is bonded to the pipe outer surface to block pipe fluid flow from a pipe defect section covered by the repair sleeve from flowing to the first termination section and the second termination section.

10. The method of claim 9, wherein the wrap is wrapped around the pipe in an online condition, and wherein the pipe has fluid pressure and the repair sleeve is formed on the pipe with the pipe in the online condition.

11. The method of claim 9, further comprising identifying the pipe defect in the pipe based on a condition of the pipe, and wherein the repair sleeve covers the pipe defect and a pipe repair section.

12. The method of claim 11, wherein the pipe defect is a through-wall defect in the pipe repair section.

13. The method of claim 9, wherein wrapping the wrap around the pipe outer surface includes bonding the repair sleeve to the pipe outer surface with the adhesive.

14. The method of claim 9, further comprising:
abrasively cleaning the first termination section to form a first outer diameter for the first termination section, and wherein the first inner seal forms a seal on the abrasively cleaned first termination section.

15. The method of claim 9, further comprising:
enclosing a second termination enclosure over the second termination section to form a second pressure containing connection with the repair sleeve, the second termination enclosure including:
disposing a second outer seal around the pipe on the pipe outer surface, the second outer seal outwardly spaced from the second termination section to annularly seal on the pipe outer surface; and
disposing a second inner seal around the repair sleeve on a repair sleeve outer surface, the second inner seal inwardly spaced from the second outer seal to annularly seal on the repair sleeve outer surface.

16. A pipe replacement method for repairing a pipe, the method comprising:
wrapping a fiber wrap around a repair section of the pipe to form a repair sleeve having a first termination section and a second termination section;
enclosing a first termination enclosure over the first termination section to form a first pressure containing connection with the repair sleeve, the enclosing the first termination enclosure over the first termination section including:
disposing a first outer seal around the pipe on a pipe outer surface, the first outer seal outwardly spaced from the first termination section to annularly seal on the pipe outer surface; and
disposing a first inner seal around the repair sleeve on a repair sleeve outer surface, the first inner seal inwardly spaced from the first outer seal to annularly seal on the repair sleeve outer surface;
enclosing a second termination enclosure over the second termination section to form a second pressure containing connection with the repair sleeve, the second termination enclosure including:
disposing a second outer seal around the pipe on the pipe outer surface, the second outer seal outwardly spaced from the second termination section to annularly seal on the pipe outer surface; and
disposing a second inner seal around the repair sleeve on a repair sleeve outer surface, the second inner seal inwardly spaced from the second outer seal to annularly seal on the repair sleeve outer surface; and
wherein the repair sleeve is configurable in a leak path configuration where the repair sleeve forms a leak flow path extending from a pipe defect covered by the repair sleeve to the first termination enclosure and the second termination enclosure with the leak flow path sealed from an external atmosphere by the first termination enclosure and the second termination enclosure.

17. The method of claim 16, wherein the repair sleeve has an adhesive configured to bond the repair sleeve to the pipe outer surface, and wherein the repair sleeve is configurable in a non-leak path configuration where the repair sleeve blocks pipe fluid flow from a pipe defect section covered by the repair sleeve from flowing to the first termination enclosure and the second termination enclosure to seal the pipe defect from the external atmosphere with the repair sleeve, and wherein the repair sleeve is configured to move from the non-leak path configuration to the leak path configuration.

18. A pipe replacement system for repairing a pipe, comprising:
a wrap wrapped around a pipe outer surface to form a repair sleeve having a first termination section and a second termination section; and
a first termination enclosure enclosing the first termination section to form a first pressure containing connection with the repair sleeve, the first termination enclosure including:
a first upper half and a first lower half configured to be connected to form the first termination enclosure, wherein the first enclosure forms a first cavity containing the first termination section;
a first outer seal disposed around the pipe on a pipe outer surface, the first outer seal outwardly spaced from the first termination section to annularly seal on the pipe outer surface; and
a first inner seal disposed around the repair sleeve on a repair sleeve outer surface, the first inner seal inwardly spaced from the first outer seal to annularly seal on the repair sleeve outer surface, wherein the first cavity is pressure sealed by the first outer seal and the first inner seal to seal a pipe leak having a leak flow path from under the first termination section to the first cavity.

19. A pipe replacement system for repairing a pipe, comprising:
a wrap comprising a composite material is wrapped around a pipe outer surface to form a repair sleeve having a first termination section and a second termination section; and
a first termination enclosure enclosing the first termination section to form a first pressure containing connection with the repair sleeve, the first termination enclosure including:
a first outer seal disposed around the pipe on a pipe outer surface having a first seal diameter, the first outer seal outwardly spaced from the first termination section to annularly seal on the pipe outer surface; and
a first inner seal disposed around the repair sleeve on a repair sleeve outer surface having a second seal diameter, the first inner seal inwardly spaced from the first outer seal to annularly seal on the repair sleeve outer surface, wherein the first seal diameter is less than the second seal diameter.

* * * * *